(12) United States Patent
Turmanidze et al.

(10) Patent No.: US 8,485,782 B2
(45) Date of Patent: Jul. 16, 2013

(54) VARIABLE-DIAMETER ROTOR WITH CENTRIFUGAL FORCES COMPENSATION MECHANISM

(76) Inventors: Raul Turmanidze, Tbilisi (GE); Malkhaz Chkoidze, Rustavi (GE); Nodari Jojua, Rustavi (GE)

( * ) Notice: Subject to any disclaimer, the term of this patent is extended or adjusted under 35 U.S.C. 154(b) by 890 days.

(21) Appl. No.: 12/624,825

(22) Filed: Nov. 24, 2009

(65) Prior Publication Data
US 2010/0150717 A1    Jun. 17, 2010

(30) Foreign Application Priority Data

May 24, 2007 (GE) .......................... AP 2007 010094
Apr. 28, 2008 (WO) .................. PCT/IB2008/001041

(51) Int. Cl.
*F03D 11/00* (2006.01)
*B64C 27/72* (2006.01)
*F15B 1/027* (2006.01)

(52) U.S. Cl.
USPC ................................ 416/48; 416/88; 416/155

(58) Field of Classification Search
USPC ................. 416/31, 40, 41, 44, 47, 48, 87–89, 416/155, 224; 415/4.3, 4.5
See application file for complete search history.

(56) References Cited

U.S. PATENT DOCUMENTS 3,139,721 A * 7/1964 Daubenspeck ................. 60/632
6,972,498 B2 * 12/2005 Jamieson et al. ............... 290/55

* cited by examiner

*Primary Examiner* — Edward Look
*Assistant Examiner* — Jesse Prager
(74) *Attorney, Agent, or Firm* — Robert T. Burns; John T. Lucas

(57) ABSTRACT

A variable-diameter rotor comprises a hub with a shaft and rotor blades, wherein each of the rotor blades comprises a radially internal blade part and a radially external blade part. In each of the rotor blades, a jackscrew mechanism is arranged therein and includes a jackscrew arranged in the radially internal blade part and a nut connected with the radially external blade part, the nut cooperating with the jackscrew for radially moving the radially external blade part with respect to the radially internal blade part. The rotor further comprises an energy storage system, including a compressed-gas accumulator. The compressed-gas accumulator comprises a volume of gas and a piston for compressing and expanding the volume of pressurized gas. The energy storage system also includes a means for converting a radial motion of the radially external blade part into a motion of the piston of the compressed-gas accumulator and vice-versa.

8 Claims, 2 Drawing Sheets

VARIABLE-DIAMETER ROTOR WITH CENTRIFUGAL FORCES COMPENSATION MECHANISM

PRIORITY CLAIM

The invention described and claimed herein claims priority to Georgian Patent Application Serial Number AP 2007 010094. The Georgian Patent Application, whose subject matter is incorporated herein by reference, provides the basis for a claim of priority of invention under 35 U.S.C. 119(a)-(d).

TECHNICAL FIELD

The invention generally relates to the field of variable-diameter rotors, as used, for instance, in aviation. The application of such rotors is also possible in wind energy installations, in water transport vehicles, or wherever a variable-diameter rotor might be used.

BACKGROUND ART

Vertical take-off and landing (VTOL) aircrafts are well known. Some types of such aircrafts take-off and land in "helicopter mode" with their propeller axes oriented substantially vertically. During transfer to cruise flight mode, the propeller axes are gradually rotated into a substantially horizontal position. VTOL aircrafts with fixed-diameter rotors suffer from the disadvantage of limited speed in cruise flight mode and big centrifugal forces that act on the rotor blades.

U.S. Pat. Nos. 5,642,982 and 5,735,670 disclose VTOL aircrafts with variable-diameter rotors. The latter patent describes an aircraft with a variable-diameter rotor comprising a hub having rotor blades mounted thereon wherein each of the rotor blades comprises a radially internal blade part, which is radially stationary, and a radially external blade part, which is radially movably mounted on said radially internal blade part. In each of the rotor blades, a jackscrew mechanism is provided for moving the radially external blade part with respect to the radially internal blade part. The diameter change mechanism includes, in particular, an input bevel gear, which drives one output bevel gear per blade. The output bevel gears are coupled to the jackscrews (in this case ballscrews) of the respective rotor blades. As the jackscrew is rotated about its longitudinal axis, the nuts are arranged in the radially external blade parts and with them the blade parts themselves are caused to move radially inwardly or outwardly, depending on the direction of rotation of the jackscrew.

During the operation of the rotor, big centrifugal forces act on the rotor blades. Accordingly, to move the external parts of the rotor blades inwardly, high loads have to be overcome. Additionally, with increasing rotor speed, friction between the jackscrews and the corresponding nuts increases. The high loads the jackscrew mechanism has to overcome are potentially prejudicial to aircraft safety.

To reduce this problem, a variable-diameter rotor has been proposed, in which the external parts of the telescopic rotor blades are radially movable by means of a jackscrew mechanism and wherein each blade is equipped with an additional mechanism for compensating, at least partially, the centrifugal forces acting on the jackscrew mechanism. This additional mechanism comprises a hydraulic cylinder located in each blade, a pneumo-hydraulic accumulator located in the hub and a pulley-cable arrangement. The pneumo-hydraulic accumulator is divided by a movable piston into a first volume containing hydraulic fluid and a second volume containing pressurized gas. The volume with hydraulic fluid is fluidly connected to the hydraulic cylinder. The hydraulic cylinder is fixed on a spar of the radially internal blade part between a first pulley block supported by the spar and a second pulley block supported by the piston of the hydraulic cylinder. A cable, having its first end fixed to the radially external blade part and its second end fixed to the radially internal blade part, is guided over the pulley blocks in such a way that as the external blade part moves outwardly, the cable urges the pulley blocks closer together and thereby moves the piston of the hydraulic cylinder. In turn, the hydraulic fluid flows into the pneumo-hydraulic accumulator, in which the pressurized gas is compressed further and stores the mechanical work of the motion of the external blade part.

A problem with this variable-diameter rotor is that the mechanism for compensating centrifugal forces increases the weight of the rotor blades, which is not desired. Furthermore, integration of such mechanisms into the blades is difficult due to design constraints.

TECHNICAL PROBLEM

It is an object of the present invention to provide a centrifugal forces compensation system, which does not have the above-mentioned drawbacks. This object is achieved in a variable-diameter rotor as claimed in the present invention.

GENERAL DESCRIPTION OF THE INVENTION

A variable-diameter rotor with centrifugal forces compensation mechanism (e.g., for an aircraft or a wind power installation) comprises a hub with a shaft and rotor blades mounted on the hub, wherein each one of the rotor blades comprises a radially internal blade part, which is radially stationary, and a radially external blade part, which is radially movably mounted on the radially internal blade part. In each of the rotor blades, a jackscrew mechanism, arranged therein, includes a jackscrew arranged in the radially internal blade part and a nut connected with the radially external blade part, the nut cooperating with the jackscrew for radially moving the radially external blade part with respect to the radially internal blade part. The rotor, according to the invention, further comprises an energy storage system, including a compressed-gas accumulator. The compressed-gas accumulator comprises a volume of gas and a piston for compressing and expanding the volume of pressurized gas. The energy storage system also includes a means for converting a radial motion of the radially external blade part into a motion of the piston of the compressed-gas accumulator and vice-versa, the compressed gas accumulator being arranged on the shaft of the rotor, preferably directly on the shaft. Each rotor blade preferably contains a telescopic spar, comprising a radially internal spar portion and a radially external spar portion, which is telescopically mounted on the radially internal spar portion and to which is fixed the radially external blade part.

It should be noted that, in the context of the present invention, "jackscrew mechanism" designates a mechanical device for translating rotational motion (of a threaded shaft, the "jackscrew") into linear motion (of the nut). Thus, a ballscrew mechanism is considered to be a special case of a jackscrew mechanism, wherein the nut is equipped with ball bearings and the threaded shaft forms a spiral raceway for the ball bearings.

The present invention has the advantage that the weight of the rotor blades is reduced, since they do not contain the compressed-gas accumulator. Furthermore, since the location of the accumulator is on the rotor shaft, the moment of inertia is also lower than in the conventional rotor described above.

The volume of gas is preferably fluidly connected with a container of compressed gas.

According to a preferred embodiment of the invention, the compressed-gas accumulator is a pneumo-hydraulic accumulator and the means for converting the radial motion of the radially external blade part into the motion of the piston comprises a hydraulic cylinder hydraulically connected to the pneumo-hydraulic accumulator and a pulley-cable arrangement. The pulley-cable arrangement is so configured as to convert a radial linear motion of the radially external blade part into a motion of a piston of the hydraulic cylinder and vice-versa. When the piston of the hydraulic cylinder is actuated, the hydraulic fluid flows into the hydro-pneumatic accumulator and compresses the gas, whereby the mechanical work of the centrifugal force causing the motion of the external part of the rotor blade is stored as potential energy. The hydraulic cylinder is also arranged on the shaft, preferably directly on the shaft.

The pneumo-hydraulic accumulator is preferably divided into a first chamber and a second chamber by the piston of the pneumo-hydraulic accumulator, the first chamber being hydraulically connected with the hydraulic cylinder and the second chamber defining the volume of pressurized gas. The pneumo-hydraulic accumulator may also comprise a spring in the second chamber, the spring being compressible by movement of the piston of the pneumo-hydraulic accumulator.

The pulley-cable arrangement advantageously comprises a cable, the cable having a first end fixed to the radially external blade part and a second end fixed to the hub, and a pulley block over which the cable is guided, the pulley block being fixed to the piston of the hydraulic cylinder in such a way that as the external blade part moves outwardly, the working volume of the hydraulic cylinder is reduced. Most preferably, the pulley-cable arrangement comprises a further pulley block which is fixed to the cylinder barrel of the hydraulic cylinder, the two pulley blocks being brought closer together by the cable as the external part of the rotor blade moves outwardly so the working volume of the hydraulic cylinder is reduced.

Preferred aspects of the present invention relate to vehicles (e.g., aircrafts, in particular VTOL aircrafts) and installations (e.g., wind turbines) equipped with variable-diameter rotors as described herein.

BRIEF DESCRIPTION OF THE DRAWINGS

Further details and advantages of the present invention will be apparent from the following detailed description of a not limiting embodiment with reference to the attached drawings, wherein.

DESCRIPTION OF A PREFERRED EMBODIMENT

Figure 1:
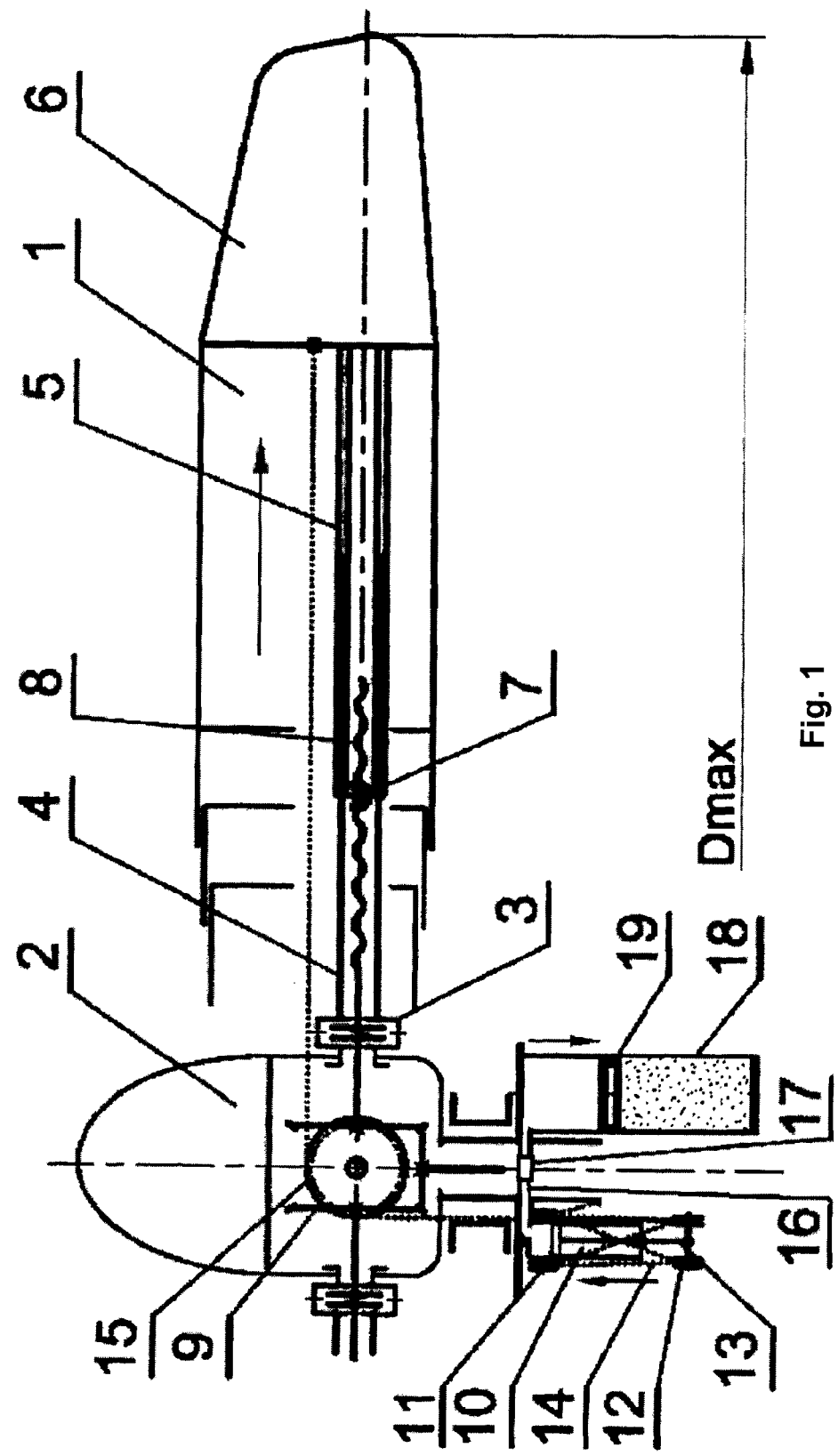
FIG. 1 is a schematic partial view of a variable-diameter rotor with extended blades.
Figure 2:
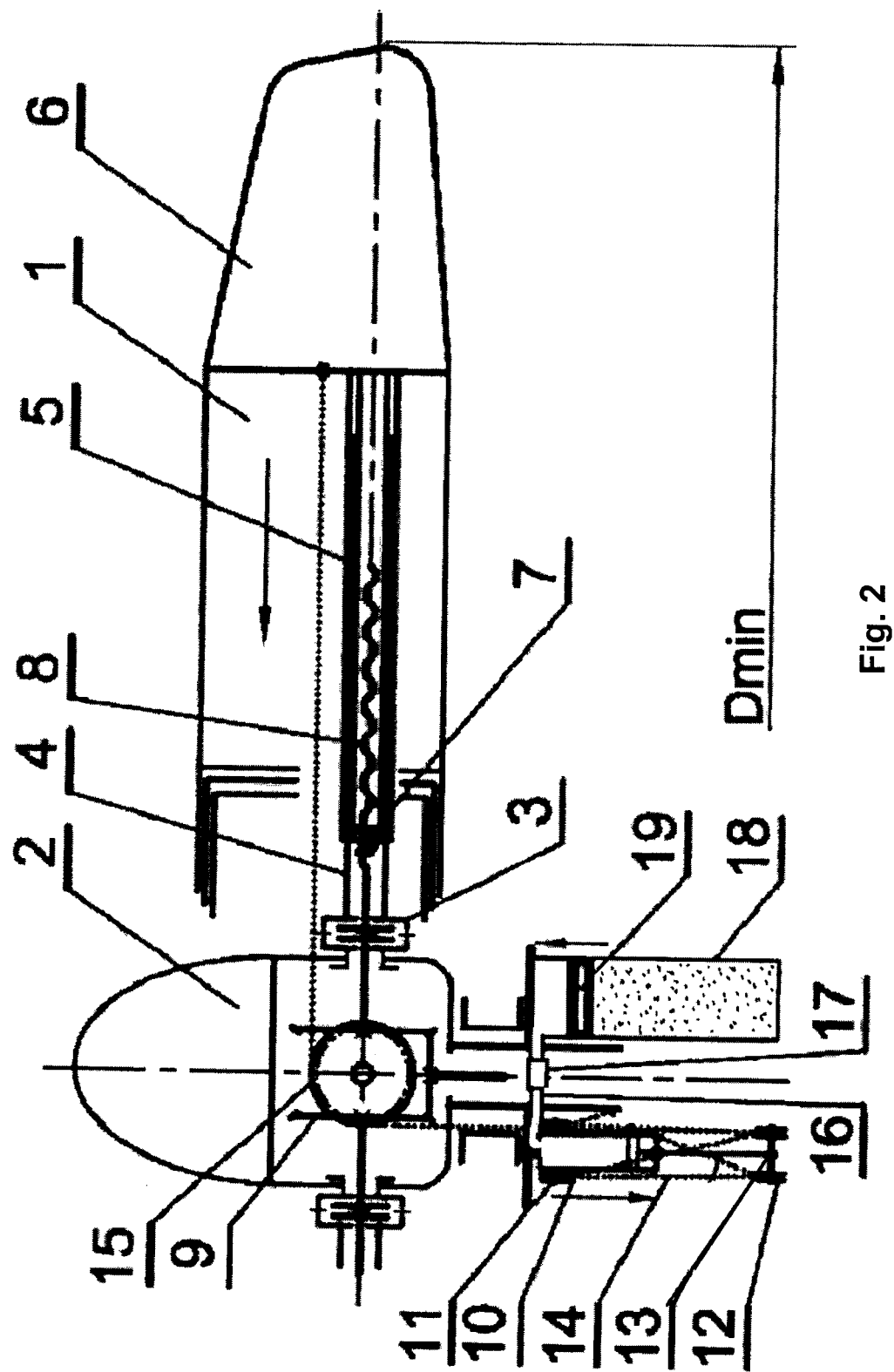
FIG. 2 is a schematic partial view of the same rotor as in FIG. 1 with retracted blades.

As shown in FIGS. 1 and 2, the rotor according to this preferred embodiment of the invention comprises a hub 2 and rotor blades 1 (only one of which is shown) mounted to the hub 2 by a hinge 3. Each blade 1 comprises a radially internal blade part, which is radially stationary, and radially movable external blade parts 6. The external blade parts 6 are fixed to the radially external part 5 of a telescopic spar. The radially external part 5 of the spar is telescopically mounted on a radially internal part 4 of the spar. On the outmost external blade part 6 is fixed the nut 7 of the jackscrew mechanism (7, 8). When the jackscrew 8 is rotated about its longitudinal axis, the nut 7 and thus the external rotor blade parts 6 are caused to move radially inwardly or outwardly, depending on the direction of rotation of the jackscrew 8, so as to vary the diameter between a minimum value Dmin and a maximum value Dmax. The jackscrew 8 is actuated by a bevel gear 9 coupled to it and driven by input bevel gear, which is arranged within the rotor shaft.

On the rotor shaft shown in the lower part of the hub body is fixed a hydraulic cylinder 10 and a pneumo-hydraulic accumulator 18. The pneumo-hydraulic accumulator 18 is divided by a piston 19 into a first chamber containing hydraulic fluid and a second chamber containing a pressurized gas, (such as e.g., nitrogen or an inert gas). The hydraulic cylinder 10 is fluidly connected to the first chamber of the pneumo-hydraulic accumulator 18 by means of a hydraulic conduit 16. The piston 13 of the hydraulic cylinder is actuatable by a pulley-cable arrangement (11, 12, 14, 15), comprising a pre-tensioned cable 14, fixed by one end to the radially external part 6 of the rotor blade and by the other end to the shaft of the rotor, and pulley blocks (11, 12) over which the cable 14 is guided. From the fixing point on the radially external blade part 6, the cable extends inside the blade 1 substantially parallel to the telescopic spar (4, 5) to the hub 2, where it is deviated along the rotor shaft to the first and second pulley blocks 11 and 12 by a deflection pulley 15. The pulley-cable arrangement is so configured as to provide for the correct transmission ratio of the linear movement of the external blade part 6 into linear movement of the piston 13 of the hydraulic cylinder 10. Pulley block 12 is fixed on the piston 13 of the hydraulic cylinder 10, whereas the other pulley block 11 is fixed to the rotor shaft together with the barrel of the hydraulic cylinder 10, so that the pulley blocks (11, 12) are brought closer together when the external blade part 6 moves outwardly.

Changing the diameter of the variable-diameter rotor is effective, as described in the present paragraph, for example, for a VTOL aircraft whose rotor axes may be brought into a vertical position for take-off and landing. During cruise flight, the rotor blades 1 are normally in the retracted position. During transition into landing mode, the blades 1 are progressively extended. The rotor blades 1 are subject to various forces, among which the propulsive force of the rotor shaft and the centrifugal force. The centrifugal force is directed radially outwardly from the rotor axis and contributes to the radially outward movement of the external blade parts 6. The work of the centrifugal force is converted into potential energy via the pulley-cable arrangement (11, 12, 14, and 15) and the hydraulic cylinder 10 and stored in the pneumo-hydraulic accumulator 18 during the diameter increase. As the diameter of the rotor increases, the radially external blade part 6 pulls on the cable 14, which in turn acts on the first and second pulley blocks (11, 12) in such a way that the piston 13 of the hydraulic cylinder 10 urges the hydraulic fluid (usually oil) through the hydraulic conduit 16 into the first chamber of the pneumo-hydraulic accumulator 18. This displaces the piston 19 of the pneumo-hydraulic accumulator 18 so as to reduce the volume of the second chamber of the accumulator 18 and thereby compress the gas contained therein. When the diameter change is over, the valve 17 between the hydraulic cylinder 10 and the first chamber of the accumulator 18 is closed. The landing of the aircraft is carried out while the rotor blades 1 are extended and thus provides greater lift. The whole process is reversed after takeoff of the aircraft (which is also carried out with extended rotor blades) during the transition into cruise flight mode. In this case, as the rotor blades 1 have to be retracted, the centrifugal force has to be overcome jointly by the jackscrew mechanism (7, 8) and the energy storage system. The valve 17 is opened so that the hydraulic liquid may by pushed back by the expanding pressurized gas in the second chamber of the accumulator 18, from the first chamber of the accumulator 18 into the hydraulic cylinder 10. As hydraulic liquid enters the hydraulic cylinder 10, the piston 13 increases the distance between the pulley blocks 11 and 12, so that the cable 14 pulls on the external blade part 6 and thereby reduces the load on the nut 7 and the jackscrew 8.

While the present invention has been described with reference to preferred embodiments of the variable-diameter rotor, those skilled in the art may make modifications and alterations to the present invention without departing from the scope and spirit of the invention. Accordingly, the above detailed description is intended to be illustrative rather than restrictive. The invention is defined by the appended claims, and all changes to the invention that fall within the meaning and range of equivalency of the claims are to be embraced by their scope.

What is claimed is:

1. A variable-diameter rotor, comprising;
   a hub with a shaft;
   rotor blades, mounted on said hub, wherein each one of said rotor blades comprises a radially internal blade part, which is radially stationary, and a radially external blade part, which is radially movably mounted on said radially internal blade part;
   in each one of said rotor blades, a jackscrew mechanism is arranged therein, said jackscrew mechanism including a jackscrew arranged in said radially internal blade part and a nut connected with said radially external blade part, said nut cooperating with said jackscrew for radially moving the radially external blade part with respect to the radially internal blade part; and
   an energy storage system, including a compressed-gas accumulator, said compressed-gas accumulator comprising a volume of gas and a piston for compression and expansion of said volume of pressurized gas, said energy storage system further includes a means for converting a radial motion of said radially external blade part into a motion of the piston of said compressed-gas accumulator and vice-versa, said compressed gas accumulator being arranged on said shaft.

2. The variable-diameter rotor according to claim 1, wherein said volume of gas is fluidly connected with a container of compressed gas.

3. The variable-diameter rotor according to claim 1, wherein said compressed-gas accumulator is a pneumo-hydraulic accumulator and wherein said means for converting the radial motion of said radially external blade part into the motion of the piston comprises a hydraulic cylinder hydraulically connected to said pneumo-hydraulic accumulator, and a pulley-cable arrangement, configured for converting a radial motion of said radially external blade part into a motion of a piston of said hydraulic cylinder and vice-versa, wherein said hydraulic cylinder is also arranged on said shaft.

4. The variable-diameter rotor of claim 3, wherein said pneumo-hydraulic accumulator is divided into a first chamber and a second chamber by the piston of said pneumo-hydraulic accumulator, said first chamber being hydraulically connected with the hydraulic cylinder and said second chamber defining said volume of pressurized gas.

5. The variable-diameter rotor according to claim 3, wherein said pneumo-hydraulic accumulator comprises a spring in said second chamber, said spring being compressible by movement of the piston of said pneumo-hydraulic accumulator.

6. The variable-diameter rotor according to claim 3, wherein said pulley-cable arrangement comprises a cable, said cable having a first end fixed to said radially external blade part and a second end fixed to said hub, and a pulley block over which said cable is guided, said pulley block being fixed to the piston of said hydraulic cylinder.

7. An aircraft comprising the variable-diameter rotor according to claim 1.

8. A wind turbine comprising the variable-diameter rotor according to claim 1.

* * * * *